Aug. 7, 1956

J. MOSS 2,757,940

BUSINESS FORMS

Filed Aug. 18, 1951

| Shipper | Shipped from | Rec'd. Via | Carrier's No. | Pcs. Rec'd | Wt. | Chgs. | Dept | Sec | Invoice & Rec. No. | Date Rec'd. |
|---|---|---|---|---|---|---|---|---|---|---|
| | | | | | | | | | 10051 | |
| | | | | | | | | | 10052 | |
| | | | | | | | | | 10053 | |
| | | | | | | | | | 10054 | |
| | | | | | | | | | 10055 | |
| | | | | | | | | | 10056 | |
| | | | | | | | | | 10057 | |
| | | | | | | | | | 10058 | |
| | | | | | | | | | 10059 | |
| | | | | | | | | | 10060 | |
| | | | | | | | | | 10061 | |
| | | | | | | | | | 10062 | |
| | | | | | | | | | 10063 | |
| | | | | | | | | | 10064 | |
| | | | | | | | | | 10065 | |
| | | | | | | | | | 10066 | |
| | | | | | | | | | 10067 | |
| | | | | | | | | | 10068 | |
| | | | | | | | | | 10069 | |
| | | | | | | | | | 10070 | |
| | | | | | | | | | 10071 | |
| | | | | | | | | | 10072 | |
| | | | | | | | | | 10073 | |
| | | | | | | | | | 10074 | |
| | | | | | | | | | 10075 | |

TOTALS

*INVENTOR.*
JACK MOSS

BY *[signature]*

ATT'Y.

Aug. 7, 1956  J. MOSS  2,757,940
BUSINESS FORMS
Filed Aug. 18, 1951  3 Sheets-Sheet 3
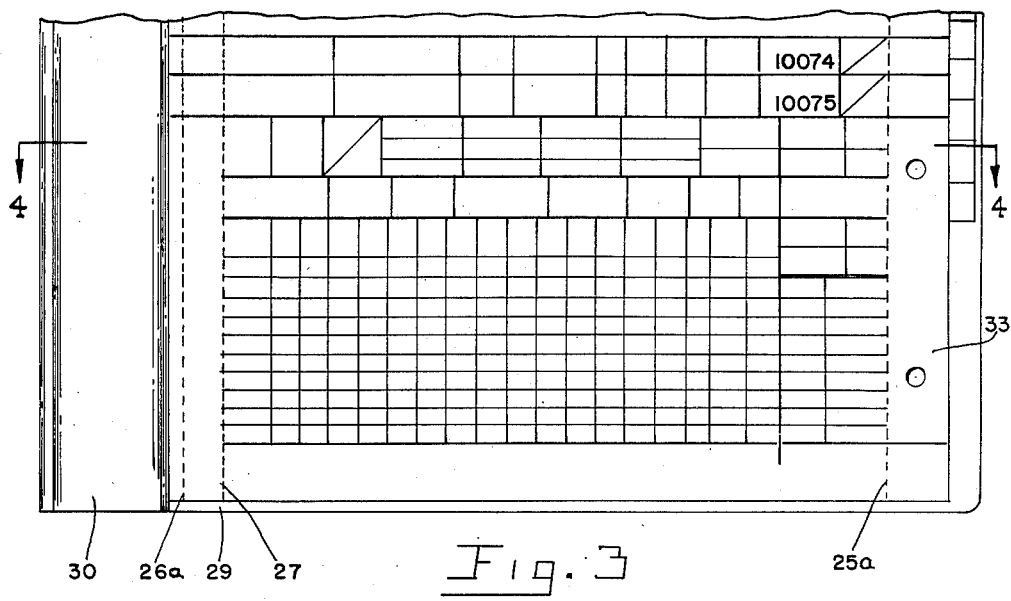
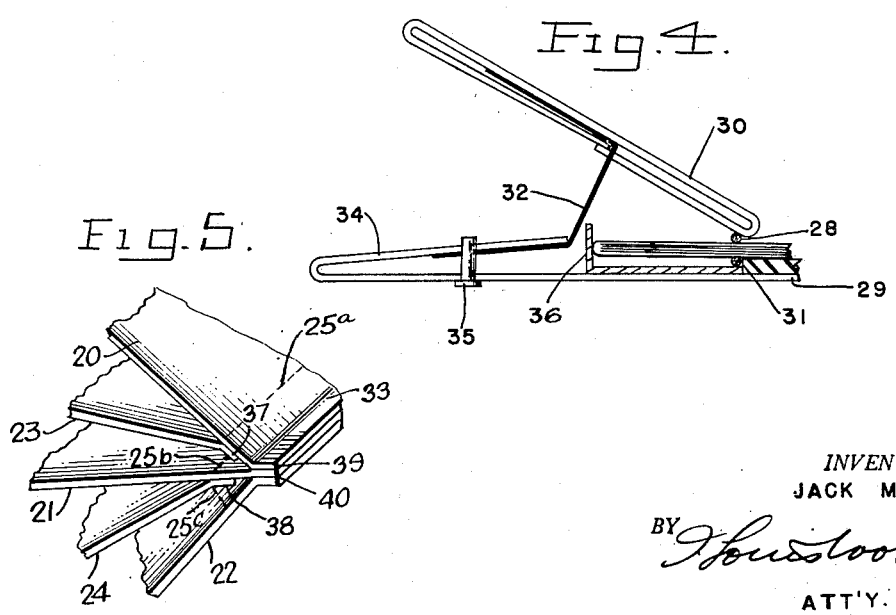
INVENTOR.
JACK MOSS
ATT'Y.

United States Patent Office 2,757,940
Patented Aug. 7, 1956

2,757,940

BUSINESS FORMS

Jack Moss, Dayton, Ohio

Application August 18, 1951, Serial No. 242,526

3 Claims. (Cl. 282—23)

The present invention relates to business forms and more particularly to multiple paper forms used in establishing business records.

The present invention was developed especially to fulfill a need for a phase of business which up to this time has generally been neglected, from the standpoint of simplification and expeditious movement of products and record forms relating thereto.

The operation of retailing is a highly complex internal operation. The average large store is composed of a number of departments each of which is individually managed. Such a store may have as many as 150 separate departments each of which stocks thousands of different items. Each department is subject to individual accounting just as if it were an individual store. This departmental accounting covers every phase of the department's merchandising cost and profit aspects.

It is a fact not generally known that retail stores are probably the largest receivers in the United States of less than carload or truckload lots of freight, parcel post, and express. While total tonnage may be less than industrial or manufacturing plants of comparable size, the number of individual shipments received is much greater. The merchandise must always be available for prompt sale and the location of retail receiving department facilities in congested downtown locations limits the space needed to properly handle the thousands of inbound shipments of all sizes and description. Any delays which occur are costly to the store and to the transportation companies and have an important effect on distribution. Because of the large number of shipments, the receiving system must carry proper and simple controls over loss and damage claims so that the nature of these may be determined, responsibility fixed, and claims properly and promptly filed.

In addition, the receiving department must authenticate as properly payable every invoice covering all merchandise and supplies which the store receives. This invoice then serves as the posting medium from which all departmental records are obtained, inventories calculated, and buying budgets adjusted.

A further factor which adds to the complexity of handling retail merchandise is the fact that practically every individual article of merchandise which the store sells must carry a so-called "price tag." Actually the "price" on the tag is but one of the important items of information which the retail marking ticket carries. This ticket is the basis of the store's inventory and sales records, reorder information, and unit controls. The receiving department of the store is charged with the responsibility of preparing and attaching these marking tickets.

All of these conditions have created a need for a receiving system which will handle shipments very speedily but with proper departmental controls. These controls must cover not only the actual inbound distribution of the physical materials, but they must also see that invoices and orders are properly cleared so discounts may be obtained and departmental purchase records kept accurate and up to date. Furthermore, the various merchandising divisions must be provided with proper records of the actual merchandise units moving through the store.

Another aspect of a retail system is the need for controls which prevent loss or "stock shortage" which requires that proper paperwork maintain contact with all goods at every point where they change hands.

Prior to the development of the receiving record system described herein the best equipment available consisted of autographic types of registers. These machines, however, do not combine the necessary simplicity, portability, and general flexibility to cope with the various problems arising in handling merchandise of this type. Such equipment is subject to breakdown at critical times and does not permit more than one receiving clerk to operate during emergency periods without losing important serial number controls.

It is therefore an object of the present invention to provide a portable merchandise receiving system form assembly incorporating multiple records.

It is a further object of the present invention to provide a merchandise receiving form system which with one initial writing creates both a receiving line report and an invoice number register control, and simultaneously creates multiple records used in all the essential operating functions which are necessary before merchandise is sold or invoices made payable.

It is an additional object of the present invention to provide a preassembled receiving form system designed to be inserted on a portable light-weight supporting and clamping board to provide a suitable writing surface, said supporting board also serving to hold the assembly, at the same time assuring positive detachment of the necessary units of the system.

The invention is illustrated in the accompanying drawings wherein Figure 1 is a plan view of the form system assembly arranged for insertion into the clamp of the supporting board and showing the arrangement of the individual sheets.

Figure 2 is a plan view of the key-record sheet construction prior to preassembly of the forms.

Figure 3 is a plan view of the bottom portion of the assembled forms on the supporting board.

Figure 4 is a cross-sectional view taken along the left-hand portion of line 4—4 of Figure 3.

Figure 5 is an enlarged view in perspective showing the right-hand edge assembly of the individual sheets of a set of forms, with the sheets separated to illustrate their edge adhesion.

Figure 1:
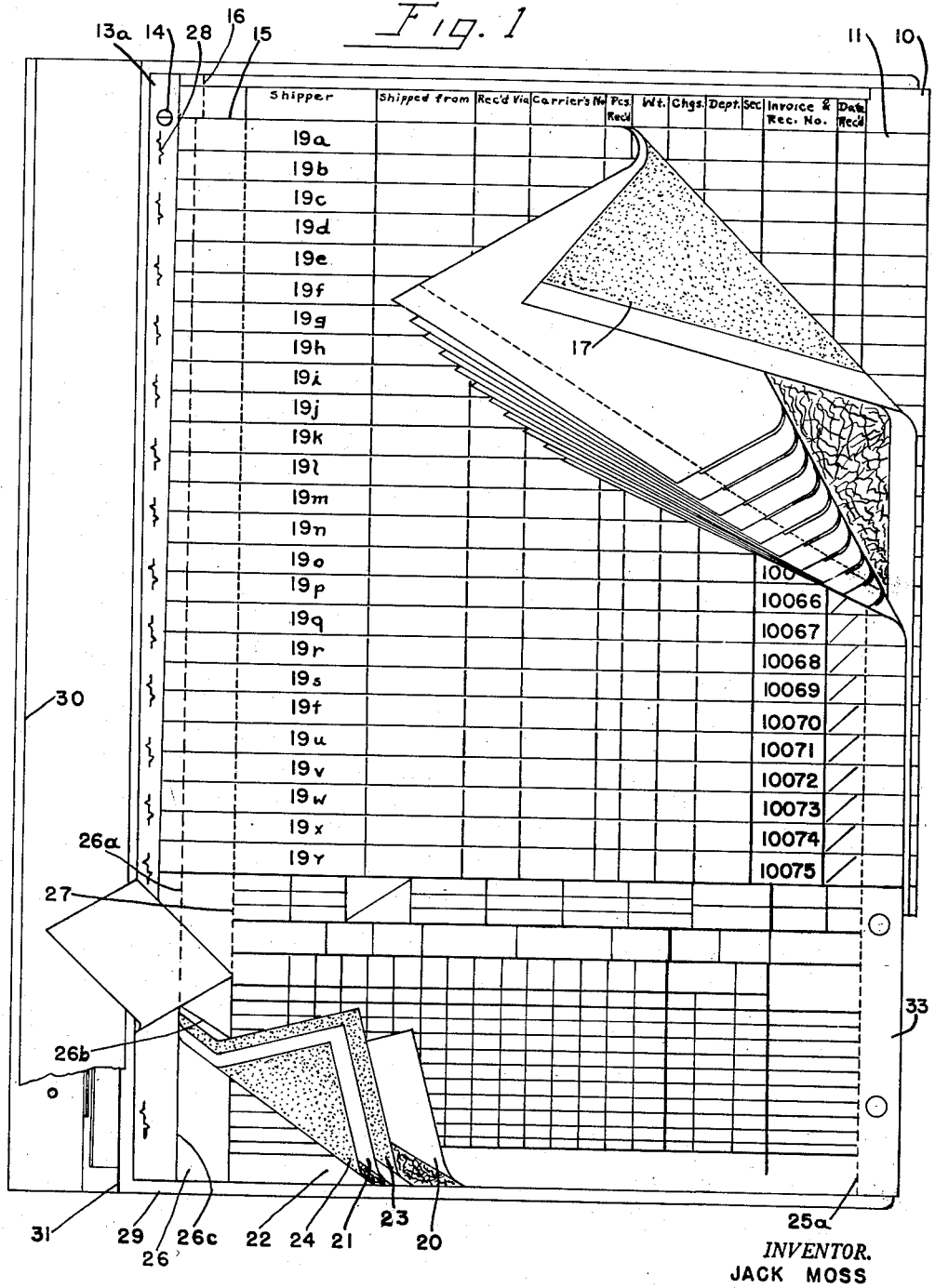

By referring to the drawings, it will be seen that the receiving system comprises a form assembly composed of a key-record sheet 10 which is described in Figure 2. This sheet is divided into a desired number of horizontal spaces 11 and vertical spaces as at 12. The horizontal spaces are prenumbered consecutively downwardly of the sheet as shown in column 12, such numbers eventually becoming the receiving and invoice numbers, while the vertical columns are headed with the usual information recorded on receipt of shipments in merchandising establishments. The key-record sheet 10 is formed with scored fold line 13 extending vertically of the sheet. This line is formed at an angle to the margin and is spaced a greater distance from the left-hand margin at the top than at the bottom as shown at $a$ and $b$. The purpose of this angle will be explained further below.

The left-hand margin of the key-record sheet has opening 14 formed near the top. This opening intersects an extension line 15 and defines the top of the first horizontal space. The opening and the taper of the fold line 13 play an important part in preassembly of the forms as will be seen from the description below. The key-record sheet is also formed with a scored or perforated vertical line 16 appropriately spaced from the right edge of the sheet 10 and parallel to the edge of the sheet to permit easy removal of the key-record sheet by tearing.

The system is preassembled by the manufacturer thereof to form the assembly shown in Figure 1 by first superimposing a sheet of carbon paper 17 which overlies the vertical and horizontal spacings of the key-record sheet. The carbon sheet is of proper size and so positioned that the preprinted columnar headings are visible and act as a guide to postings which will be made on the lines or spaces which they head. A plurality of serially numbered receiving record assembly sets 19a to y, inclusive, are then arranged by the manufacturer in superimposed relationship in such a manner that the top horizontal space of each successive set coincides with a correspondingly numbered horizontal space on the key-record sheet. The receiving sets 19a to y as shown in Figure 1, are arranged in staggered superimposed relationship in downward direction on the key-record sheet and superimposed carbon with the top receiving set always being in direct contact with the key-record sheet carbon.

The receiving report assemblies or sets are constructed as follows:

As illustrated at the bottom of Figure 1, and in Figure 5, each receiving report assembly or set is composed of a set of superimposed printed parts, each part being an individual printed form separated by carbon paper. As many parts may be superimposed as required. The figure is illustrated with three parts as shown at 20, 21, and 22. These are separated by the sheets of carbon paper 23 and 24 and are usually different colors. Each receiving report set is preassembled with the parts and carbon paper, the parts being attached together adjacent to the vertical edges by means of adhesive, with the carbon paper sheets being adhered adjacent to the right-hand edge only but with all paper parts also adhered together on the left at stub 26. Each part is perforated vertically along the tearing lines, with the top part perforated at 25a, 26a, and 27, with the parts beneath having corresponding perforations at 26b and c in line with 26a and similar corresponding perforations 25b and 25c in line with 25a. In the set, the top part only is perforated at 27 to permit removal of this part only along that line. Lines 26a, b, c are perforated to weaken the forms to a greater extent than along lines 25a, b, c, and 27. This will permit the entire set of forms with carbon paper interleaved to be removed from the assembly by tearing along lines 26a, b, c in the manner hereinafter described. In view of the fact that each carbon is adhered to a corresponding form along the right-hand edge thereof to the right of perforations 25a and 25b, as shown at 37 and 38, respectively, and since the respective forms comprising the set are also adhered along the right-hand margin at the right of perforations 25a, b, c, as shown at 39 and 40, the set of forms is removed with parts in proper register.

The key-record sheet and the individual receiving report assemblies are then assembled in staggered relationship by the manufacturer as shown in Figure 1, it being of absolute necessity that the serially numbered top horizontal space on each set is in registry with the corresponding horizontal space on the key-record sheet. The vertical columns of each set must also register exactly with the corresponding columns on the key-record sheet. The receiving report sets are positioned a slight distance from the right-hand edge of the key-record sheet and its carbon to permit each set to be readily grasped. The right edges of the sets are kept in exact horizontal registry while the left-hand margin of the key-record sheet is folded over at the fold line 13 to form folded over portion 13a. The angle of the fold line as described above, is provided to allow for the progressively increasing thickness of the assembly caused by the superimposed sets which reaches a maximum point, and the degree of angle is adjusted to correspond to the number of thicknesses of the receiving report sets which are bound to the key-record sheet. After the fold has been formed and before final binding or stapling of the receiving report sets to the key-record sheet, the exact proper registry of the assembled members with the top line 15 of the key-record sheet and its carbon is indicated by inspection through opening 14 so that final adjustment may be made if necessary prior to fastening the receiving report sets to the key-record sheet by staples 28. Other fastening means, such as sewing or the like, may be used if desired.

The completed unit assembly consisting of key-record sheet, key-record carbon, and the receiving report sets, is then ready for use by the store receiving clerk and is packaged for shipment to the store by the manufacturer. When needed by the store receiving clerk the next serially numbered assembly is inserted by the clerk under the clamp of supporting board 29 which is provided with the longitudinal spring clamp 30. The assembly is illustrated prior to clamping in Figure 1 and after clamping in Figures 3 and 4. As shown in Figures 3 and 4, the clamp board 29 is formed with a longitudinal ridge 31 to be engaged by the projecting portions of staple 28. This tends to resist the lateral pull of the individual sets when extracted by tearing of lines 26a, b, c as described above, since clamp 30 is urged by spring 32 to contact with the set and thus hold the staples against the ridge. In this way each receiving report set is removable by lateral pull without affecting the remaining sets of forms. The clamping action is created by member 30 normally urged in closed position by spring 32 attached thereto at one end and to bent-over portion 34 at the other end by means of rivets or the like 35. A single long spring or a plurality of spaced springs may be used. Turned up portion 36 provides a stop for holding the assembly against further movement to the left. At least one staple is inserted near the top left-hand corner of each set to permit firm clamping of the set when it is pulled out.

In use of the receiving system the supporting board provides a convenient, portable writing base for the receiving clerk who in actual practice notes down the necessary details of each shipment of merchandise received on the top line only of each successive receiving report set thereby automatically establishing a master key record on the key-record sheet. As noted, the retail receiving problem is one requiring great flexibility of personnel and equipment. It is obvious that the KEY-REC boards permit working at any location on the receiving dock, platform, on elevators, near conveyor lines, or even inside trucks or freight cars. In addition, it is frequently necessary to add receiving clerks for brief periods without losing number control sequence. Autographic registers do not permit this flexibility in that they take considerable time to reload and usually hold upwards of 250 forms. An extra register cannot be used for brief periods because the numbers cannot be kept consecutive between the various machines. The KEY-REC assemblies may be given to any number of receiving clerks. Any receiving record sets unused on any assembly are simply turned back to the chief receiving clerk who proceeds to use them up before starting a new assembly, thus filling in and making consecutive all number series for the day.

On receipt of the containers of merchandise the receiving clerk fills in the top line only of the top receiving report set. This set is always the top set, always the one in direct contact with the key-record sheet and carbon, and always the lowest serially numbered set of that particular assembly. By way of example, the following information may be recorded thereon:

1. Shipper's name
2. Location shipped from
3. Name of carrier handling the shipment
4. Carrier's bill number 5. Number of shipping containers received
6. The weight
7. Transportation charges on the shipment
8. Department in the store which purchased the merchandise and the floor location of the department where the merchandise will be unpacked Each part of the receiving report set carries a receiving number which corresponds with a prenumbered space on the key-record sheet. The date of receipt of the merchandise is also inserted. This line of information constituting the top line of the receiving report set is all that is filled in by the receiving clerk. After this line is filled out, the set is removed by pulling laterally and downward from the right which will cause tearing along the weak perforation on the left-hand margin of the set. All of the parts and accompanying carbon paper sheets being adhered along the right-hand margin, the entire set is removed with the parts still in exact original registration with each other. The receiving report set is then usually stapled to one container of merchandise which is sent to the checking or unpacking location in the store. In this way the original receiving record set filled in by the receiving clerk on the receiving platform, is attached directly to the merchandise while an exact serially numbered line record of the shipment is retained by the receiving platform clerk on the key-record sheet which remains until the key-record sheet is completed after which it is sent to the control clerk. The receiving report set which is stapled to the merchandise case serves as a guide for the merchandise and determines its distribution within the store.

It will be noted that the construction of the receiving report set is such that staples of the so-called tack-point variety may be attached quickly by means of an automatic tacker and that these staples are attached in areas of the set which ordinarily do not carry printed copy necessary to the function of the system.

The construction of the receiving report set, still in registration between parts and with carbon interleaved, when attached to the container in the shipment as described, and carrying the original entries on the top serially numbered line, eliminates the need for manually writing or crayoning all or part of this same item information on the container as is the usual custom in stores which must have identification on all containers because of the thousands of such containers continuously being processed through these operations. It will be noted that all of this has been accomplished by the one original writing by the receiving clerk on the top line which simultaneously produced the key-record sheet line of information, the use of which will be further described.

After the containers have reached the correct unpacking or checking destination, and the correct number as called for under "pieces" on the top line have reached the location designated, the shipment is ready to be unpacked and the condition of the merchandise and total quantities accounted for by the unpacker or checker of the goods.

After ascertaining that the number of containers called for by the receiving report set attached to one of the lot are still there, and because loss is possible between the time the containers have been placed in the checking area and the time the checker is ready to unpack the shipment, the checker removes the receiving record set from the container by simply removing the tack-point staples. He then has the set in its original condition, i. e., as it was just after having been extracted from the key-record sheet, i. e., all parts in perfect registration with each other with carbons interleaved allowing for the writing or posting of additional information on the original part which will copy through by means of the interleaved carbons to the parts underneath. This eliminates the need for the merchandise checkers to insert or jog individual carbons and handling which might also result in the soiling of the merchandise which frequently is of light color such as ladies' garments. There is a considerable time saving involved in not having the checker handle carbons. The carbons being of the one-time or one-use type also guarantee perfect copies which are a requisite of the detailed record keeping of stores as previously described.

As previously described, it is necessary that the merchandise be properly tagged by means of marking tickets, tags, and labels after unpacking and before it can be released for selling or put into reserve stock. Also as previously described, it is necessary that proper detailed records of the style, quantities, color, and size of the units of merchandise be supplied to the merchandise division of the store for use in maintaining accurate unit control or stock control records, for use in reordering and the balancing of stocks for profitable selling operations. Also as previously described, it is necessary that the invoice be properly authenticated for payment to the paying office of the store, and that this must be done speedily so that discounts and anticipation, which in many instances represent the store's net profit, may be obtained at the earliest moment, and so that journal entries may be made and charges for the merchandise to the merchandising department be made at the earliest moment so the buyers, merchandise managers, and other executives will know promptly the exact condition of the departmental stocks. As previously described, it is necessary, above everything else in store operation, that the merchandise itself reach the selling floor or stock rooms in time for scheduled or advertised events and to meet competition which in store business is extremely active and timely when compared to other types of business. As in other systems and operations where work simplification principles have been applied it has been learned that several functions of this type must proceed simultaneously in order that one operation does not hold up, delay, or cause error in the subsequent or preceding operations. To this end, and because in modern business practice, operations are controlled and scheduled by means of system, which usually consists of paper forms, it is necessary to provide at one time, and preferably at the start of the operations, the necessary form parts which will allow these multiple operations to proceed simultaneously. This is one of the important purposes of this system because the merchandise checker by the writing of certain information on the original part of the receiving record set creates in the same writing through the interleaved carbons the necessary multiple parts which allow the previously described operations to proceed simultaneously.

Another hindrance which stores encounter in the handling of merchandise prior to sale is the controlled handling of those shipments which may arrive prior to receipt of the manufacturer's invoice. Some stores have ruled that such shipments may not be unpacked until the invoice arrives because of the control problem which is created. This is of course contrary to good retail practice because it prevents the merchandise from reaching the customer which is the reason for the store's existence. In the past stores have created so-called "dummy" invoices in order to process the merchandise received without invoice, retaining a copy of the dummy for follow-up purposes and so that an invoice may eventually be obtained. Creating such uncontrolled dummies, which have no reference to the original receiving records, frequently results in duplicate invoice payments. In any event these dummies must be headed by the checkers with the name of the shipper, number of containers received, date, and other information which is a duplication of that written by the receiving clerk. This detailed explanation of "no invoice" handling is included to show how the system described by this application simply handles this problem by providing an area on the body of the receiving apron set for this purpose which allows the so-called dummy notations to be made on the set itself, this set in turn, as previously described, having been headed by the receiving clerk and this entire record being controlled by the key-record sheet which after the preassembled number of receiving record sets have been extracted is at the control point in the store.

Without going into exact detail on the use of the parts of the receiving record set, it should be noted that the original or part one is usually pasted or otherwise secured to the manufacturer's invoice in an area allotted for this purpose. When the invoice is thus attached to part one of the receiving record set it will be noted that the serial receiving number now becomes the store's internal invoice number and control number and is henceforth used to identify that particular invoice on all internal records as well as remittance notices to the vendor when the invoice is paid. It will be seen that since there is only one serial numbered original receiving record for each invoice that an invoice cannot be paid without this serial numbered part and that this has the effect of eliminating any possibility of duplicate payment of an invoice to the manufacturer at the same time assuring that an invoice is actually passed to the office for payment for every receipt which is written up by the receiving clerk. At this point it is well to point out that the right-hand column of the key-record sheet is used to close out or control these invoices and to make absolutely certain that an invoice is passed to the payable section for every line which has been written and that no invoice may be passed for any line which has been previously closed out which is a double check against invoice duplicate payment. This is one important use of the key-record sheet but not its only function as will be described later. After the merchandise checker has detailed the receipts on the area of the receiving record set designed for this purpose, which design includes preprinted size scales, units of counting, and other notations which are used over and over and which preprinting simplifies writing, by permitting circling or checking of these preprinted items, the purchase order is compared to the invoice and the checker's listings on the receiving record set and the selling prices or "retails" are added to the set opposite the merchandise item to which they refer. Other necessary items for the marking tickets may be added, such as vendor's code, unit control classifications, and the like. At this point the receiving record set is snapped apart by holding stub section 26 in the left hand and pulling in area 33 with the right thus separating the set into its three parts along perforations 25a and the corresponding one beneath it, namely, 25b and 25c, the carbons remaining attached to stub section 33 and being disposed of without handling of the carbons themselves.

Part two or the duplicate copy of the receiving record set is passed along to the marking section where it is used as a requisition for setting type and printing of proper ticket, tag, or label according to the information written on this part through the carbon, first by the receiving clerk, then by the unpacker or checker, then by the order checker-retailer. The tickets and the duplicate part are then given to a marker who proceeds to attach the tickets to the merchandise, at the same time rechecking the individual units of merchandise noted by the checker, reporting any discrepancies to the department head for charging back to shipper or transportation company any shortages or damages. This part is then used as a production record and follow-up and usually is filed with marker's signature in receiving office files, being thereafter used for looking up "troubles" or checking production complaints and the like. While the marking is taking place from part two, the invoice attached to part one of the set has simultaneously been checked off or cleared against the key-record sheet serially numbered line as described and sent to the office for posting to the departmental purchase journals and posting on proper payment records after which it is usually filed by manufacturer's name in paid files of the store. It should be noted that an area is also provided on part one of the receiving record set where the necessary information used by the office for these accounting functions has been scientifically laid out in the sequence of the posting operations reducing insofar as possible the eye travel of the accounting machine operators or clericals performing these bookkeeping functions.

Simultaneously with these paying, recording, and marking operations, the third part of the set, containing thereon the original notations as previously described on part two, has been sent or picked up by the buyer or unit control section so that proper record of the units in the house may be posted to proper departmental stock control records.

It should be noted that additional parts may be added without changing the general operation of the system, this applying to both the key-record sheet and the receiving record set from which parts may be subtracted as well as added. It should also be noted that there is wide variation in the methods used to accomplish these multiple simultaneous operations, some stores going so far as to photostat or otherwise duplicate copies of invoices or packing slips when available only listing manually on the receiving record set in the checking operation when these documents are not available, but in every case attaching the photostat, or otherwise duplicated document, to the proper part of the set in order to properly control and authorize the functions for which the part is designed.

The key-record sheet in addition to being used as an invoice control as described, also serves as a receiving record, and is used as most business establishments use such a record, for tracing, for verifying proof of delivery, for follow-up of loss and damage claims, for tonnage reports, and for control over payment of transportation bills. The multiple line key-record sheet is compact for filing and is punched for filing in a commercial four-ring binder. The 25 line visibility of these key-record sheets make finding entries quite simple as contrasted with usual padded form sets or usual autographic register methods, which usually provide 25 single copies which must be filed or looked up one at a time. The speed with which information of receipt must be made available to department store executives makes mandatory a line receiving record as contrasted with the individually produced and filed copies previously described. This time saving also results in actual dollar savings in payroll and filing space.

While I have illustrated and described my invention with respect to one form thereof, I do not intend to be limited thereby since other modifications within the scope of the invention will be apparent to those skilled in the art and such modifications are intended to lie within the scope of the appended claims.

I claim:

1. A preassembled, ready-to-use receiving system form assembly comprising a key record sheet having a series of horizontal spaces defined thereon, a sheet of carbon paper superimposed upon said key sheet with the carbon surface opposed thereto, a plurality of receiving report sets each composed of a plurality of superimposed parts each of which has a horizontal top information receiving space defined thereon, said sets being superimposed upon said carbon sheet and said key sheet and arranged in staggered superimposed relationship with the top set resting on the carbon paper sheet over the key sheet with the horizontal top spaces of its parts being in alignment with a corresponding horizontal top space on said key sheet and the remaining receiving report sets being spaced progressively downwardly by a distance equal to the width of the horizontal top space with each successive set partially overlying the set beneath it whereby the top space of each receiving report set is exposed and is in registry with corresponding spaces on the key record sheet, each of said sheets being attached at one side edge thereof to one side edge of said key sheet, and whereby the top space on each successive set is placed in direct functioning engagement with the carbon paper superimposed on the key sheet upon the detachment of the immediately preceding set from the key sheet; each of said receiving report sets comprising a plurality of superimposed parts each part being an individual form, said forms being separated by individual sheets of carbon paper, said forms and said sheets of carbon paper being adhered together along the side edge of the set which is unattached to the key sheet, each of said forms having a marginal edge portion with a weakened line spaced from the edge which is attached to the key sheet and each of said forms being attached to said key sheet by fastening means along the marginal edge portion thereof whereby each receiving report set is detachable from the key sheet as a unit with its carbon sheets attached thereto by tearing along said weakened line, and each of said forms and said individual carbon sheets having a second weakened line adjacent to but spaced from its unattached edge, said second weakened line having a greater strength than the weakened lines adjacent the marginal edges attached to the key sheet whereby each individual form and carbon sheet may be separated from the other by tearing along said second weakened line after said set has been first removed from said key sheet.

2. A receiving system form assembly comprising a key foundation sheet having a series of horizontal spaces defined thereon, a sheet of carbon paper superimposed upon said key sheet with the carbon surface opposed thereto, a plurality of numbered receiving report form sets each of which has a horizontal top space thereon positioned transversely on said key sheet, said receiving report sets being arranged in staggered superimposed relationship with the top receiving report set resting on the key sheet and the remaining sets being spaced progressively downwardly by a distance equal to the width of the horizontal top space with each successive set partially overlying the sheet beneath it whereby the top space of each set is exposed and is in registry with a corresponding space on the key sheet, each of said receiving report sets comprising a plurality of superimposed forms separated by individual sheets of carbon paper, said forms and said carbon paper being detachably secured together along one side edge thereof, all of said sets and said key sheet being bound together along the opposite side edges thereof, said report set and said key sheet being detachably secured by perforations along said bound edge.

3. A preassembled receiving form system comprising a key-record sheet having a series of numbered spaces horizontally arranged thereon; a marginal portion folded along the line formed adjacent the left-hand margin of the key sheet; a scored line formed parallel with the fold line and spaced therefrom; a sheet of carbon paper superimposed carbon side down upon said key-record sheet extending substantially to said fold line at the left-hand side and to the right-hand edge but with the carbonized portion thereof terminating short of the edge of the sheet; a plurality of numbered receiving report form sets superimposed upon said key sheet and arranged in staggered relationship, with the bottom set positioned at the top of the key sheet and having a top horizontal numbered space in registry with a corresponding numbered space at the top of the key sheet; successive superimposed sets each spaced downwardly from the one beneath by a distance equal to the width of the corresponding space on the key sheet; said form sets each composed of a plurality of individual forms separated by sheets of carbon paper, and having a space along the left-hand side margin separated by a first-scored line from the body of the record sheet and having a space along the right-hand margin separated from the body of the form by a second-scored line, said first-scored line being so formed as to weaken each form to a greater extent than the second-scored line whereby the sets may be more readily torn along said first-scored line; each of the forms of the set being cemented to each other along the right-hand side margin between the second-scored line and the edge to permit removal of the forms of the set as a group by tearing along the first-scored line; all of said forms and the main carbon paper sheet and the key sheet being assembled along the left-hand margin of the key sheet with the first-named marginal portion of the key sheet folded over said forms and the main carbon paper sheet and united thereto.

References Cited in the file of this patent

UNITED STATES PATENTS

| | | |
|---|---|---|
| 1,187,685 | Waters | June 20, 1916 |
| 1,602,285 | Schaber | Oct. 5, 1926 |
| 2,089,247 | Benson | Aug. 10, 1937 |
| 2,100,814 | Morrison | Nov. 30, 1937 |
| 2,173,332 | Hoffman | Sept. 17, 1939 |
| 2,495,388 | Ryan | Jan. 24, 1950 |
| 2,506,015 | Doepke | May 2, 1950 |
| 2,524,128 | Jones | Oct. 3, 1950 |
| 2,647,765 | Brechner | Aug. 4, 1953 |

FOREIGN PATENTS

| | | |
|---|---|---|
| 607,428 | Great Britain | Aug. 31, 1948 |